UNITED STATES PATENT OFFICE.

EBENEZER KENNARD MITTING, OF CHICAGO, ILLINOIS, ASSIGNOR TO JAMES S. KIRK & CO., OF SAME PLACE, AND ALBERT DOMEIER, OF LONDON, ENGLAND.

PROCESS OF RECOVERING GLYCERINE FROM SPENT SOAP-LYE.

SPECIFICATION forming part of Letters Patent No. 428,509, dated May 20, 1890.

Application filed September 2, 1889. Serial No. 322,759. (No specimens.)

*To all whom it may concern:*

Be it known that I, EBENEZER KENNARD MITTING, a subject of the Queen of Great Britain, residing at Chicago, in the county of Cook and State of Illinois, have invented certain new and useful Improvements in Recovering Glycerine from Spent Soap-Lye, of which the following is a specification.

The object of this invention is to provide an improved process for removing the impurities from spent soap-lye to facilitate the recovery of crude glycerine and salt therefrom. I take the spent soap-lye, and in case it contains an appreciable quantity of alkali worth recovering I first treat it with a small proportion of caustic lime, effecting intimate admixture therewith and remove the clear liquor from the precipitate. The effect of the lime is to clarify the liquor from some impurities in suspension and solution and to a great extent to causticize the carbonated alkali present. I next concentrate the liquor until it becomes saturated with salts, or nearly so, and then boil it with fat or a fatty acid, which removes most of the free alkali. I next neutralize the remaining alkali with a suitable acid. By preference I use hydrochloric acid. In the case of spent lye not containing much free alkali I proceed to neutralize it at once with the acid and then concentrate the neutralized liquor until it is saturated with salts, or nearly so. I next take the saturated and neutral liquor produced by either of the foregoing methods and add to and mix intimately with it a small proportion of a fibrous or flocculent or cellular or organic substance—such as cellulose, lignose, tunicin, or cutose, (met with in the ordinary forms of paper-pulp, wood pulp, cork-meal, &c.,) or a similar inorganic substance—such as asbestus—and then add hydrochloric or other suitable acid to render insoluble the fatty and resinous impurities. The proportion of fibrous, flocculent, or cellular substance required varies with the character of the spent lyes treated; but ordinarily from one-quarter to one-half of one per cent., by weight, is sufficient. I filter or settle and filter the clear liquor from the impurities and neutralize any free acid therein by means of a suitable alkali—such as carbonate of soda or caustic soda—removing any precipitate which may be formed, and then concentrate the clear liquor by boiling to a temperature of about 300° Fahrenheit, removing the salts, and thus produce crude glycerine fit for distillation. The object of the first neutralization with acid and concentration to the point at which the liquor is saturated with salt, or nearly so, is threefold—first, to prevent frothing from the presence of soapy matters during the concentration; second, to coagulate and precipitate albuminous impurities, and, third, to bring the liquor into the best physical condition for the next treatment—viz., to a point at which it is saturated or nearly saturated with salts. The next step—the addition of acid—has for its object the rendering insoluble of the fatty and resinous acids contained in solution in the liquor, with a view to filter them therefrom; but as these bodies are set free in an extremely fine state of division their filtration in an expeditious manner, so as to leave the liquor bright, becomes a matter of considerable difficulty, even with the best-known appliances. The addition of the small proportion of cellulose or its equivalent, which acts as a collector, overcomes this difficulty, and I maintain this collector in suspension in the liquor until it has collected the impurities by agitation—as, for example, by mechanical stirrers or injection of air. When such fibrous, flocculent, or cellular matter is suspended throughout the liquor, the finely-divided particles of the fatty and resinous acids set free by the addition of acid, as above described, are collected by and adhere to the flocculent matters, and the liquor may then be filtered therefrom with the utmost ease and expedition. Any fibrous, flocculent, or cellular matters which will perform this function I regard as equivalent to the cellulose and other substances I have mentioned. The cellulose or its equivalent and the quantity of acid necessary to render insoluble the fatty and resinous acids may be added directly to the spent lye without intermediate evaporation, and in such case the albuminous bodies are not fully precipitated until the liquor is neutralized with the alkali previous to final concentration. By this order of working the same ultimate result is obtained, but in a less convenient manner, owing to the larger bulk of acidified liquor which has to be dealt with, and a little larger quantity of acid is also generally required to act upon a given quantity of spent lye than is the case when such quantity of lye is concentrated to some extent after neutralization.

The advantage of the processes above described over common methods resides chiefly in the fact that the fibrous, flocculent, or cellular substance and the collected impurities adhering thereto remain in a porous condition and do not form a dense mass to clog or block the filter, whereby filtration of the clear liquor would be difficult and tedious. On the contrary, the whole of the liquor is brought into a condition in which it can be rapidly and perfectly filtered from the separated impurities.

I claim—

1. In the recovery of glycerine and salt from spent soap-lye, the improvement which consists in adding an excess of acid thereto in the presence of cellulose or its equivalent fibrous, flocculent, or cellular substance, whereby to precipitate and collect the fatty and resinous impurities, and then filtering to remove the precipitated impurities, substantially as described.

2. In the recovery of glycerine and salt from spent soap-lye, the improvement which consists in adding an excess of acid thereto in the presence of cellulose or its equivalent fibrous, flocculent, or cellular substance, and then filtering to remove the precipitated impurities, next neutralizing with an alkali and concentrating, substantially as described.

3. In the recovery of glycerine and salt from spent soap-lye, the improvement which consists in first neutralizing the lye with acid and concentrating it until it is saturated or nearly saturated with salts, and then treating it with cellulose or its equivalent fibrous, flocculent, or cellular substance and an excess of acid and filtering to remove the precipitated impurities, substantially as described.

4. In the recovery of glycerine and salt from spent soap-lye, the improvement which consists in first neutralizing the lye with acid and concentrating it until it is saturated or nearly saturated with salts, and then treating it with cellulose or its equivalent fibrous, flocculent, or cellular substance and an excess of acid and filtering to remove the precipitated impurities, neutralizing with an alkali and concentrating, substantially as described.

EBENEZER KENNARD MITTING.

Witnesses:
FERDINAND ELLERMAN,
ARTHUR GILBERT SWEET.